(12) United States Patent
Tanaka et al.

(10) Patent No.: US 7,961,813 B2
(45) Date of Patent: Jun. 14, 2011

(54) MULTI-VALUE MODULATION/DEMODULATION METHOD AND MULTI-VALUE MODULATION/DEMODULATION DEVICE

(75) Inventors: Masayoshi Tanaka, Tokyo (JP); Takuya Eguchi, Tokyo (JP)

(73) Assignee: Nihon University, Tokyo (JP)

( * ) Notice: Subject to any disclaimer, the term of this patent is extended or adjusted under 35 U.S.C. 154(b) by 501 days.

(21) Appl. No.: 11/991,314

(22) PCT Filed: Sep. 6, 2006

(86) PCT No.: PCT/JP2006/317630
§ 371 (c)(1),
(2), (4) Date: Aug. 4, 2008

(87) PCT Pub. No.: WO2007/029927
PCT Pub. Date: Mar. 15, 2007

(65) Prior Publication Data
US 2008/0304556 A1  Dec. 11, 2008

(30) Foreign Application Priority Data

Sep. 6, 2005 (JP) ................................ 2005-257608
Feb. 28, 2006 (JP) ................................ 2006-052263

(51) Int. Cl.
  *H04L 27/36* (2006.01)
(52) U.S. Cl. ......... 375/298; 375/296; 375/308; 375/130
(58) Field of Classification Search .................. 375/298, 375/130, 295, 296, 316
See application file for complete search history.

(56) References Cited

U.S. PATENT DOCUMENTS

| | | | |
|---|---|---|---|
| 5,612,651 A | 3/1997 | Chethik | 332/103 |
| 6,118,987 A | 9/2000 | Hiramatsu et al. | 455/108 |
| 6,185,259 B1 | 2/2001 | Dent | 375/261 |
| 7,095,274 B2 * | 8/2006 | Lopez Villegas et al. | 329/304 |

FOREIGN PATENT DOCUMENTS

| | | |
|---|---|---|
| JP | 200464154 | 2/2004 |
| JP | 2004104503 | 4/2004 |

* cited by examiner

*Primary Examiner* — Shuwang Liu
*Assistant Examiner* — Dhaval Patel
(74) *Attorney, Agent, or Firm* — Jacobson Holman PLLC

(57) ABSTRACT

N (integer equal to or above 3) quaternary phase shift keying (QPSK) outputs having different amplitude levels, i.e., $r2=r1\times 2^{-(i-1)}$, $i=2\ldots N$ with respect to a maximum amplitude level r1 are superposed after power amplification to form $M(=2^{2N})$-valued/quadrature amplitude modulation (QAM), and N-1 outputs si except the quaternary phase shift keying QPSK-1 having the maximum amplitude r1 are subjected to power amplification in this formation, then the outputs are combined by a directional coupler to obtain a combined signal, and an output of the quaternary phase shift keying QPSK-1 and the combined signal are transmitted from two systems of antennas to be vectorially superposed and combined in a space.

8 Claims, 22 Drawing Sheets

(a) AM-AM conversion and efficiency

| SCHEME | CONDITIONS | Eb/N0 [dB] | HPA EFFICIENCY % | POWER CONSUMPTION (ABSOLUTE VALUE) |
|---|---|---|---|---|
| CONVENTIONAL 64QAM | 3dB OBO | 15.1 | 20 | 1.00 |
|  | 5dB OBO | 13.8 | 14 | 1.06 |
|  | 7dB OBO | 13.5 | 8 | 1.73 |
| SPATIALLY SUPERPOSED 64QAM | PHASE ERROR: 30 deg GAIN ERROR: 1dB | 17.6 | 40 | 0.89 |
|  | PHASE ERROR: 20 deg GAIN ERROR: 1dB | 14.2 | 40 | 0.41 |
|  | PHASE ERROR: 15 deg GAIN ERROR: 1dB | 13.4 | 40 | 0.34 |
|  | PHASE ERROR: 10 deg GAIN ERROR: 1dB | 13.0 | 40 | 0.31 |
|  | PHASE ERROR: 0 deg GAIN ERROR: 1dB | 13.0 | 40 | 0.31 |

△ :ANT-1

◆ :ANT-2

MULTI-VALUE MODULATION/DEMODULATION METHOD AND MULTI-VALUE MODULATION/DEMODULATION DEVICE

This is a national stage of PCT/JP06/317630 filed Sep. 6, 2006 and published in Japanese.

TECHNICAL FIELD

The present invention relates to modulation/demodulation used in communication, and more particularly to modulation/demodulation method and apparatus that perform multi-level modulation effective for high-speed communication to realize highly efficient power amplification.

BACKGROUND ART

Although wireless communication using electric waves plays a considerable role as an access line to a network like mobile communication or broadband communication, electric waves are a finite resource, and a frequency band is limited. On the other hand, with advancement of an information technology, a demand for high-speed/high-capacity communication is increased, and performing high-speed communication in a limited frequency band is desired. One of the solutions is application of a multi-level modulation scheme. Although the multi-level modulation is a scheme enabling transmission of an information volume including multiple bits by using one symbol, identifying symbols becomes difficult with realization of multiple values, and it is apt to undergo degradation in transmission characteristics due to noise, interferences, and non-linear characteristics of an amplifier.

FIG. 1 is a block diagram of 64-QAM as one of multi-level modulations using amplitude modulators. Information of six bits as transmission data is divided in parallel, modulators AM Mod-1 and AM Mod-2 convert two carrier waves perpendicular to each other into amplitude-modulated waves each having eight levels (corresponding to three bits), and respective outputs are subjected to vector combination by a combiner $\Sigma$. A combined 64-QAM signal wave is amplified by a power amplifier (HPA) and transmitted from an antenna ANT.

FIG. 2 shows a spatial signal arrangement view of a uniformly arranged 64-QAM signal wave. The 64-QAM signal wave has 10 values having different amplitudes and is affected by AM-AM and AM-PM conversions as non-linear characteristics of the power amplifier depicted in FIG. 3, and a spatial signal arrangement is transformed as shown in FIG. 4. Therefore, a reception side has a problem that an original signal can not be correctly demodulated and an error rate is increased.

To solve this problem, a transmission power must be increased by an amplifier having an excellent linearity, but there are drawbacks, i.e., a reduction in an efficiency of the amplifier in a region having the excellent linearity, a rise of price of the amplifier with an increase in the transmission power, a high capacity of a power supply, and an increase in price of the system due to, e.g., a countermeasure to heat generation.

When subjecting a multi-level modulation signal to power amplification, in order to suppress degradation in a transmission performance due to non-linear characteristics of the amplifier, an output is sufficiently lowered (output back-off) from a saturation point as shown in FIG. 3, and an operation is performed at an operation point where the linearity becomes excellent. However, this case has a drawback that an efficiency of the power amplifier is lowered. FIG. 5 shows a relationship between input-output characteristics and a power efficiency of a typical power amplifier. When an input power is increased, an output power is increased and a power efficiency also rises. The efficiency becomes maximum immediately before a region where the output demonstrates saturation. As apparent from this drawing, when output back-off is performed to put a high priority on the linear characteristics, the output power is reduced and the power efficiency is decreased at the same time. Therefore, to obtain a desired output, a power amplifier having a higher output is required, and there is a drawback of a high price of the system due to, e.g., an increase in a power consumption, a high capacity of a power supply, or a need for hardware for a measure against heat.

Meanwhile, as a conventional combining method for combining a plurality of signal waves having different types of information, there is one using a hybrid circuit, but it has a drawback of a reduction in a power combining efficiency due to a theoretical combination loss and a loss of a line of a circuit, and this is also a method using a plurality of antennas to individually combine a plurality of signal waves in a space, but it has a drawback that distances to reception points are different because reference points of the respective antennas are different, and gains (amplitude and phase) consequently become different from each other and a vector after combination varies in dependence on a reception position.

For example, FIG. 6 shows a method of combining two types of signal waves S-1 and S-2 by using a hybrid circuit (H), then amplifying the combined wave by a power amplifier PA, and transmitting this wave from one antenna ANT, and FIG. 7 shows a method of individually amplifying two types of signal waves S-1 and S-2 by power amplifiers PA-1 and PA-2, then combining these waves by a hybrid circuit H, and transmitting this wave from an antenna ANT, but a combination loss of 3 dB theoretically occurs in the hybrid circuit H in this case. Further, a loss due to a circuit loss also occurs.

Furthermore, FIG. 8 shows a method of combining four types of signal waves S-1, S-2, S-3, and S-4 by using hybrid circuits H-1, H-2, and H-3 and then transmitting the combined wave from one antenna ANT. In this case, a combination loss of 3 dB likewise occurs in each of the hybrid circuits H-1 to H-3. Moreover, a loss due to a circuit loss also occurs. Any other types of signal waves can be combined in the same manner. FIG. 9 shows a method of combining two types of signal waves S-1 and S-2 in a space by using two antennas ANT-1 and ANT-2. In this case, phase shifters $\phi$-1 and $\phi$-2 are adjusted so as to have the same phase in a desired direction, and then power amplifiers PA-1 and PA-2 individually perform amplification. Although two or more types of signal waves can be likewise combined by using a plurality of antennas, in the technology depicted in FIG. 6, the power amplifiers PA has to be operated in regions having an excellent linearity in order to avoid degradation in transmission characteristics due to an influence of non-linear characteristics of the power amplifiers PA, and hence there is a drawback of a reduction in a power efficiency.

Additionally, the conventional combining method using the hybrid circuits depicted in FIG. 7 or FIG. 8 has the drawbacks that the combination loss of 3 dB theoretically occurs in each hybrid circuit, the combination loss is large, and the combination efficiency is decreased as explained above.

Further, in the conventional combination method using the plurality of antennas depicted in FIG. 9, assuming that a distance between the two antennas is d, a path difference d·sin $\theta$ occurs in lengths of propagation paths to reception points in a service area SA in infinity along the θ direction as shown in FIG. 10. As a result, phases of both signal waves at the reception points in the service area SA are different from each other except for a case where an angle θ=0 as depicted in FIG. 11. That is, a vector after combination differs depending on each reception point since both the phases are different depending on the angle θ.

Patent Document 1: Japanese Patent Application Laid-open No. 1996-288970
Patent Document 2: Japanese Patent Application Laid-open No. 1997-238171

DISCLOSURE OF INVENTION

Problem to be Solved by the Invention

Therefore, it is an object of the present invention to provide a novel structure of multi-level modulation equal to or above 64-valued quadrature amplitude modulation as one type of multi-level modulation that is hardly affected by non-linear characteristics of a power amplifier (HPA) and can highly efficiently operate the power amplifier, and also provide modulation/demodulation method and apparatus suitable for this structure.

Means for Solving Problem

To achieve this object, a multi-level modulation/demodulation method according to claim 1 of the present invention is characterized in that N (integer equal to or above 3) quadri-phase shift keying (QPSK) outputs having different amplitude levels, i.e., $r2=r1\cdot2^{-(i-1)}$, $i=2 \ldots N$ with respect to a maximum amplitude level r1 are superposed after power amplification to form $M(=2^{2N})$–valued/quadrature amplitude modulation (QAM), and N-1 outputs si of the respective executions of quadri-phase shift keying QPSK-i (i=2 to N) except the quadri-phase shift keying QPSK-1 having the maximum amplitude r1 are subjected to power amplification at the time of this formation, then the outputs are combined by a directional coupler having N-1 input terminals and one output terminal to obtain a combined signal, and an output of the quadri-phase shift keying QPSK-1 and the combined signal are transmitted from two systems of antennas to be vectorially superposed and combined in a space.

In the multi-level modulation/demodulation method according to claim 1, the method according to claim 2 is characterized in that a series/parallel converter is provided before each QPSK unit to divide input data of 2N bits and input the divided data to each QPSK unit, a data converting function is used to perform gray encoding by which a code distance between codes adjacent to each other becomes 1, and a variable gain unit and a variable phase shifter adjust a gain and a phase in a signal path of each QPSK unit and a power amplifier.

In the multi-level modulation/demodulation method according to claim 2, the method according to claim 3 is characterized in that a signal spatial arrangement that is a non-uniform arrangement where the amplitude of the quadri-phase shift keying QPSK-1 having the highest amplitude is increased as compared with the uniform arrangement where geometrical distances between respective signal points are equal is used as a signal spatial arrangement to perform modulation.

In the multi-level modulation/demodulation method according to claim 3, the method according to claim 4 is characterized in that a gain (amplitude) error and a phase error as errors at the time of vector-combining an output signal of the QPSK-1 with a combined signal of the plurality of executions of QPSK-i (i=2 to N) are estimated from a reception signal when transmitting a known signal, these estimated values are used to consider the gain error and the phase error, and a demodulation symbol is detected from a transformed signal spatial arrangement and the reception signal.

To achieve the object, a multi-level modulation/demodulation apparatus according to claim 5 is characterized by comprising: quadri-phase shift keying units that superpose N (integer equal to or above 3) quadri-phase shift keying (QPSK) outputs having different amplitude levels, i.e., $r2=r1\cdot2^{-(i-1)}$, $i=2 \ldots N$ with respect to a maximum amplitude level r1 after power amplification to form $M(=2^{2N})$–valued/quadrature amplitude modulation (QAM); a power amplifier that amplifies powers of N-1 outputs si from respective executions of quadri-phase shift keying QPSK-i (i=2 to N) except the quadri-phase shift keying QPSK-1 at the time of formation; means for performing combination by using a directional coupler having N-1 input terminals and one output terminal to obtain a combined signal after power amplification; two systems of antennas that transmit an output of the quadri-phase shift keying QPSK-1 and the combined signal; and means for vectorially superposing and combining these transmitted signals in a space, wherein a variable gain unit and a variable phase shifter which are arranged in a signal path of each quadri-phase shift keying unit and the power amplifier to adjust a gain and a phase, a series/parallel converter which divides input data of 2N bits and inputs the divided data to each quadri-phase shift keying unit, and data converting means for performing gray encoding by which a code distance between codes adjacent to each other becomes 1 are provided before each quadri-phase shift keying unit.

In the multi-level modulation/demodulation apparatus according to claim 5, the apparatus according to claim 6 is characterized in that a signal spatial arrangement that is a non-uniform arrangement in which the amplitude of the quadri-phase shift keying QPSK-1 having the highest amplitude is increased as compared with the uniform arrangement where geometrical distances between respective signal points are equal is used as a signal spatial arrangement to perform modulation.

In the multi-level modulation/demodulation apparatus according to claim 6, the apparatus according to claim 7 is characterized in that a gain (amplitude) error and a phase error as errors at the time of vector-combining an output signal of the quadri-phase shift keying QPSK-1 with a combined signal of the plurality of executions of quadri-phase shift keying QPSK-i (i=2 to N) are estimated from a reception signal when transmitting a known signal, these estimated values are used to consider the gain error and the phase error, and a demodulation symbol is detected from a transformed signal spatial arrangement and the reception signal.

An apparatus according to claim 8 is characterized in that an output having the highest level of outputs of a plurality of executions of quadri-phase shift keying (QPSK) is divided by a power division circuit and then amplified by a power amplifier to be fed to an antenna element, and the outputs other than the output having the highest level are combined, then divided by the power division circuit, and amplified by the power amplifier to be fed to then antenna element.

Effect of the Invention

The apparatus according to the present invention can operate in a saturation region where efficiencies of a plurality of power amplifiers can be increased, reduce a power consumption, and economically achieve a system configuration based on a reduction in a capacity of a power supply and simplification of thermal control.

Further, according to the apparatus of the present invention, adding the function of estimating a non-uniform signal arrangement and a superposition error enables reducing an influence of the superposition error and decreasing an error rate, thus providing a great effect in a reduction in a transmission power and in a power consumption.

BEST MODES FOR CARRYING OUT THE INVENTION

The best modes for carrying out the present invention will now be explained hereinafter.

The present invention has a constitution that does not perform 64-QAM by using two orthogonal amplitude modulators like a conventional technology but performs a vector configuration with respect to outputs from three quadri-phase shift keying units (QPSK) in order to suppress an influence of non-linear characteristics of a power amplifier. When combining the outputs, the outputs having the second and third largest amplitudes are combined by a directional coupler, and then the two signal outputs are superposed and combined in a space by using two different antennas. When combining powers in the space, a gain and a phase involve a superposition error. To reduce an influence of this error, non-uniform signal spatial arrangement 64-QAM is performed on a modulation side, a function that estimates gain and phase errors is provided on a demodulation side to calculate a gain error and a phase error, and a signal spatial arrangement transformed based on the estimated gain error and phase error is calculated with respect to a signal spatial error at the time of modulation, and demodulation is carried out based on this arrangement.

That is, in 64-valued quadrature amplitude modulation (64-QAM) as one type of multi-level modulation, for example, three or more outputs of quadri-phase shift keying (QPSK) having different amplitude levels are superposed after increasing a power to form M-valued (value that is equal to or above 64 to the 2N-th) QAM, and outputs from respective QPSK-i (i=2 to N) except QPSK-1 having the largest amplitude are combined by a directional coupler after power amplification to obtain a combined signal at the time of formation, and an output from the QPSK-1 having the largest amplitude is spatially superposed on and combined with this combined signal. A signal path of each QPSK unit and a power amplifier includes a variable phase shifter and a variable gain which adjust a gain and a phase, and also includes a divider that inputs input data to each modulator and a data converting function for gray encoding.

A constitution of an embodiment according to the present invention will now be explained.

As shown in FIG. 12, in 64-QAM modulation, combining outputs from three QPSK units (which will be simply referred to as QPSK-1, QPSK-2, and QPSK-3 hereinafter) enables solving a problem of a great fluctuation in an amplitude of a waveform of an output signal due to execution of 64-QAM modulation according to the conventional technology depicted in FIG. 1. When respective amplitude levels are different and a signal arrangement is uniform as shown in FIG. 2, respective signal levels are 6 dB different from each other. FIG. 13 shows a specific example of the present invention where the three QPSK signals are superposed.

In the drawing, the following expressions are achieved:

$s1 = r1 \cdot \exp(j\phi1)$;

$s2 = r2 \cdot \exp(j\phi2)$; and $s3 = r3 \cdot \exp(j\phi3)$ where $ri$ and $\phi i$ (i=1, 2, 3) are an amplitude and a phase of each QPSK signal. Each of output signals s1, s2, and s3 from the respective QPSKs has a substantially fixed amplitude and, since an AM fluctuation is small, separately inputting these signals to power amplifiers HPA-1, HPA-2, and HPA-3 enables limiting influences of AM-AM conversion and AM-PM conversion as non-linear characteristics of the power amplifiers depicted in FIG. 3. A signal spatial arrangement in an ideal state can be realized by adjusting a phase rotation due to AM-PM conversion by the variable phase shifter provided in accordance with each modulator and adjusting a gain change due to AM-AM conversion by the variable gain unit.

Amplifier outputs S2 and S3 of the QPSK-2 and the QPSK-3 are combined by a directional coupler DC having a coupling degree of 6 dB to obtain a combined output S23=S2+S3, and S1 as an output from the QPSK-1 and S23 are respectively supplied to different phased array antennas ANT to be superposed and combined in a space. In order to reduce an influence of a code error in 64-QAM where combination is carried out, gray code conversion where a distance between codes adjacent to each other is determined as 1 is performed. Therefore, input data (d1, d2, . . . , d6) is divided into (d1, d2), (d3, d4), and (d4, d6), and then gray code conversion (d'3, d'4), (d'5, d'6) is carried out.

An ideal signal C on a transmission side can be represented as follows.

$$C = S1 + S2$$

In reality, an error is involved at the time of combination, and hence a transmission signal T is represented by the following expression.

$$T = S1 + S23 [\alpha t \cdot \exp(j\beta t)]$$

where $\alpha t$ and $\beta t$ are a gain error and a phase error when combining S1 with S23.

Spatial superposition will now be explained. When combining respective QPSK modulation outputs, superposition using a microwave circuit involves a circuit loss, but performing superposition and combination in a space by using different antennas enables superposition without involving the circuit loss. However, in spatial superposition, when a phase error due to a difference in propagation distance between a transmission point and a reception point or gain and phase errors due to a radiation pattern occur, a reception signal R varies as represented by the following expression.

$$R = S1 + S23 [\alpha t \cdot \exp(j\beta t)][\alpha r \cdot \exp(j\beta r)] + n = S1 + S23 [\alpha t \alpha r \cdot \exp(j(\beta t + \beta r))] + n$$

where $\alpha r$ and $\beta r$ are a gain error and a phase error involved by spatial superposition, and n is noise. Therefore, as an antenna type, it is desirable to use a phased array antenna by which transmission central points become the same and two radiation patterns become the same so as to have the same propagation distance and the same radiation pattern.

Non-uniform modulation will now be explained. When a phase error occurs in superposition and combination in a space, a phase of the QPSK-2+QPSK-3 rotates with respect to that of the QPSK-1 in the uniform signal arrangement depicted in FIG. 2, and hence each distance between signal points in a signal space is shortened as depicted in FIG. 14. Thus, in order to maintain the distance between the signal points even though a phase error occurs between the QPSK-1 and the QPSK-2+QPSK-3, a non-uniform signal arrangement where an amplitude of the QPSK-1 is increased is used as shown in FIG. 15. FIG. 16 shows a reception signal arrangement when a modulation wave using the non-uniform signal arrangement involves gain and phase errors. FIG. 16 depicts that each distance between the signal points is maintained.

Demodulation based on a transformed signal spatial arrangement having a superposition error estimating function will now be explained. Before demodulation, a known symbol is transmitted for a fixed period to estimate gain and phase errors that have occurred in superposition on a reception side. Rotating the phase of the QPSK-2+QPSK-3 with respect to that of the QPSK-1 for the signal spatial arrangement set on the transmission side by using these estimated values α' and β' and simultaneously changing the gain enables forming a transformed signal spatial arrangement represented by the following expression.

$$C'=S1+S23\cdot[\alpha'\cdot\exp(j\beta')]$$

This transformed signal spatial arrangement is used to judge which reception symbol is closest to which signal point, and then demodulation is carried out.

EXAMPLE 1

FIG. 17 shows a relationship between an error rate and an energy-noise power density ratio (Eb/No) per bit when each power amplifier is set to an operation point of output back-off 0 dB, 3 dB, 5 dB, or 7 dB in the conventional technology. For reference, linear characteristics as an ideal state are also shown. A reed solomon error correction code and a convolution error correction code having a ½ coding ratio are applied to the characteristics. When the output back-off is increased, transmission characteristics are improved, and the error rate is lowered. However, the output and the power efficiency are simultaneously reduced with the output back-off.

FIG. 18 shows transmission characteristics with a phase error and a gain error being used as parameters when modulation has a uniform signal arrangement and demodulation does not have a superposion error estimating function in the structure of the modulating section depicted in FIG. 13. The error rate is increased based on the phase error and the gain error. FIG. 19 shows transmission characteristics with a phase error and a gain error being used as parameters when modulation has a non-uniform signal arrangement and demodulation has the superposition error estimating function in the constitution according to the present invention depicted in FIG. 13. It can be understood that the transmission characteristics are greatly improved based on the non-uniform signal arrangement and the superposition error estimating function. FIG. 20 shows a comparison of power consumptions between a system according to the conventional technology and that according to the present invention based on FIGS. 17, 18, and 19. The power consumption is calculated from the energy-noise power density ratio (Eb/No) per bit and the efficiency of the power amplifier required to realize an error rate 1×10−5 under respective conditions. It can be understood from FIG. 20 that using the present invention enables realizing a great reduction in the power consumption.

EXAMPLE 2

Although 64-QAM is explained in Example 1, a constitution and others applied to N=4, i.e., 256(=28)–valued QAM can be likewise adopted. In this example, outputs from a QPSK-3 and a QPSK-4 are combined by a 6-dB directional coupler DC-1 to obtain S34. Moreover, an output from a QPSK-2 is coupled with S34 by a directional coupler DC-2 to obtain S234. Additionally, the outputs S1 and S234 are superposed and combined in a space by using two systems of antennas. Therefore, in this embodiment, the same effect as that of 64-QAM can be expected.

EXAMPLE 3

Meanwhile, as already explained with reference to FIGS. 9 and 10, in the conventional combining method using a plurality of antennas, when the path difference d·sin θ occurs between the lengths of the propagation paths to the reception points in the service area SA due to the distance d between the two antennas, phases of the two signal waves at the reception points in the service area SA are different from each other except for the case where the angle θ=0, and a vector after combination differs depending on each reception point since the two phases differ in dependence on the angle θ. FIG. 22 shows a structure in which a quadri-phase shift keying (QPSK) wave corresponding to FIG. 12 and a 16-valued quadrature amplitude modulation (16-QAM) wave are superposed and combined in a space to realize 64-QAM. FIG. 23 shows a signal spatial arrangement view of 64-QAM (corresponding to 64-QAM on the right-hand side in FIG. 12) in an ideal state where two antenna gains have no phase difference when transmission is performed by using the structure depicted in FIG. 22. On the other hand, a signal spatial arrangement of 64-QAM when the two antenna gains have a phase difference is as shown in FIG. 14. That is, it has been already explained that the signal spatial arrangement view of 64-QAM changes due to a phase difference between both antennas and the transmission characteristics are degraded.

Thus, in the phased array antenna according to the present invention, antenna elements are arranged in a pattern of A (A: an integer) concentric circles having different radii, the antenna elements whose number is an integral multiple of B (B: an integer) are arranged on each concentric circle at equal intervals, and B types of signal waves are supplied to the antenna elements on each of the A concentric circles every (B-1) antenna elements through a phase shifter. FIG. 24 shows its specific structure. This example is an example of a two-wave superposing/combining antenna in which eight array antenna elements ANT-1 and ANT-2 are arranged on one concentric circle at equal intervals and a radius is set to a half-wave length. FIG. 25 three-dimensionally represents a radiation pattern of one antenna ANT-1 in the two types of antennas depicted in FIG. 24. φ is an azimuth angle in a polar coordinate, and θ is an angle from a boresight direction. A radiation pattern of the other antenna ANT-2 can realize substantially the same characteristics.

FIG. 26 shows an amplitude difference in gain between both the antennas ANT-1 and ANT-2. The gain difference is substantially zero in the range where θ is ±5 degrees, and the gains match with each other. FIG. 27 shows a phase difference in gain between both the antennas ANT-1 and ANT-2 depicted in FIG. 24. There is substantially no phase difference in the range where θ is ±20 degrees.

EXAMPLE 4

FIG. 28 shows an example of a two-wave superposing/combining antenna in which 6 array antenna elements ANT-1 and ANT-2 are arranged on each of two concentric circles at equal intervals. This is an example where a radius of a first concentric circle is set to a half-wave length, a radius of a second concentric circle is set to √3-fold of the half-wave length, and a feed voltage of the array elements on the second concentric circle is set to 0.6-fold of a feed voltage of the array elements on the first concentric circle. A reference point of the two phased array antenna groups is a central point of the concentric circles. As a result, it is possible to realize characteristics that distances to reception points are equal and the two types of antenna elements have substantially equal gain amplitude and phase.

FIG. 29 three-dimensionally represents a radiation pattern of one antenna ANT-1 in the two types of antennas depicted in FIG. 24. φ is an azimuth angle in a polar coordinate, and θ is an angle from a boresight direction. A radiation pattern of the other antenna ANT-2 can realize substantially the same characteristics. Comparing with FIG. 25, it can be understood that a side lobe is decreased.

FIG. 30 shows an amplitude difference between gains of both the antennas depicted in FIG. 28. A gain difference is substantially zero in the range where the angle θ is ±20 degrees, thereby realizing no difference. FIG. 31 shows a phase difference between gains of both the antennas ANT-1 and ANT-2 depicted in FIG. 28. It can be understood that the phase difference is substantially within 0.2 degree in the range where the angle θ is ±5 degrees and there is nearly no difference. That is, when such structures as shown in FIGS. 24 and 28 are adopted, in regard to antenna gains with respect to two signal waves, the gains (amplitude, phase) substantially match with each other in the wide range in a main beam direction. As a result, a waveform obtained by superposing and combining the two types of signal waves in a space is substantially the same at any reception point in the main beam in the range where the angle θ is ±10 degrees.

It is to be noted that the above has explained combining the two waves, two or more types, i.e., N types of signal waves can be likewise combined. Additionally, gains can be heightened and a side lobe can be reduced by providing antennas in a pattern of a plurality of concentric circles having different radii and increasing the number of array antenna elements.

FIG. 32 shows an example where the phased array antenna according to the present invention is applied to a multi-level modulation wave transmission circuit that superposes and combines two waves, i.e., a QPSK wave and a 16-QAM wave to realize a 64-QAM wave. P/P is a device that performs parallel-parallel conversion with respect to input data, and a carrier wave is subjected to phase modulation in quadri-phase shift keying units QPSK-1, QPSK-2, and QPSK-3 based on this input data. Here, in regard to outputs from the quadri-phase shift keying units QPSK-1, QPSK-2, and QPSK-3, the QPSK-1 has the highest output level. A COM circuit combines the QPSK-2 with the QPSK-3 to generate a 16-QAM wave. Each of a QPSK-1 wave as a signal S-1 and the 16-QAM wave as a signal S-2 is divided into three by each of power division circuits DIV-1 and DIV-2. The three divided S-1 waves are then subjected to phase adjustment by phase shifters φ-1, φ-2, and φ-3 and input to respective power amplifiers PA-1, PA-2, and PA-3, and amplified signal waves are fed to respective array elements of an antenna ANT. On the other hand, the three divided S-2 waves are subjected to phase adjustment by phase shifters φ-4, φ-5, and φ-6 and input to respective power amplifiers PA-4, PA-5, and PA-6, and amplified signal waves are fed to the respective array elements of the antenna ANT. As shown in FIGS. 26, 27, 30, and 31, a phase difference and a gain difference at the time of spatial superposition are small, highly accurate vector combination can be performed at reception points in a service area, and the power amplifiers PA-1, PA-2, and PA-3 having large power consumptions can efficiently amplify QPSK waves having small amplitude fluctuations, thereby realizing an efficient transmitter. It is to be noted that an output from the quadri-phase shift keying unit is divided into three by the power division circuit DIV-1 or DIV-2 in the example depicted in FIG. 32, but this division number may be an any numerical value other than 3 as long as it is equal to or above 2.

EXPLANATIONS OF LETTERS OR NUMERALS

Figure 1:
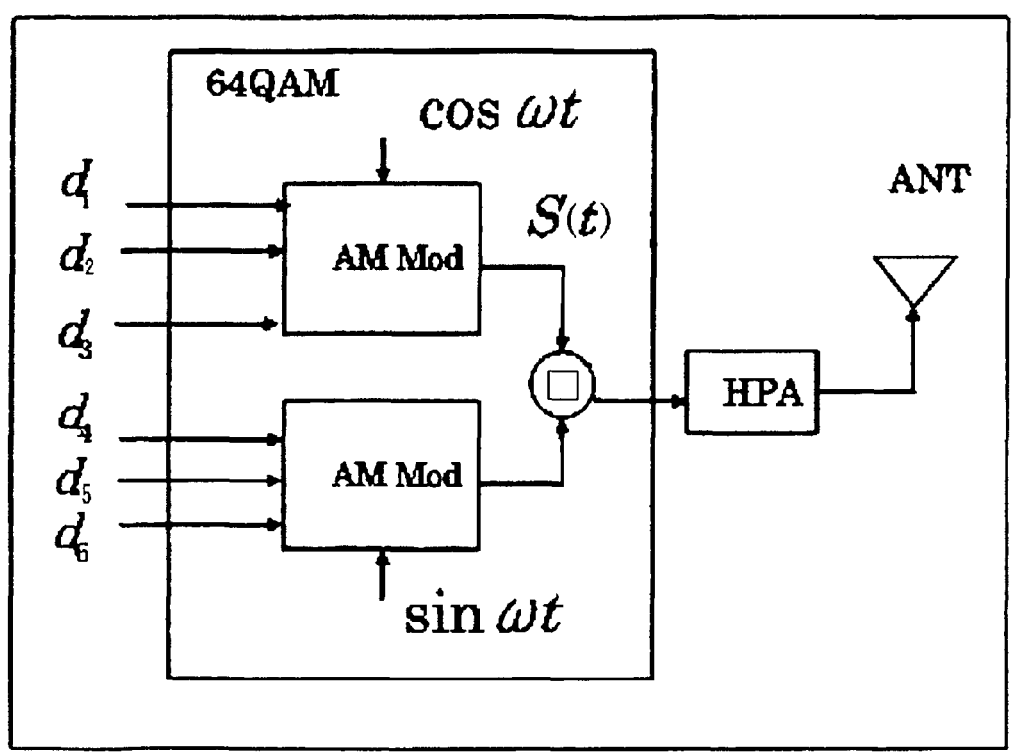
FIG. 1 is a view showing a conventional 64-QAM transmitting section.
Figure 2:
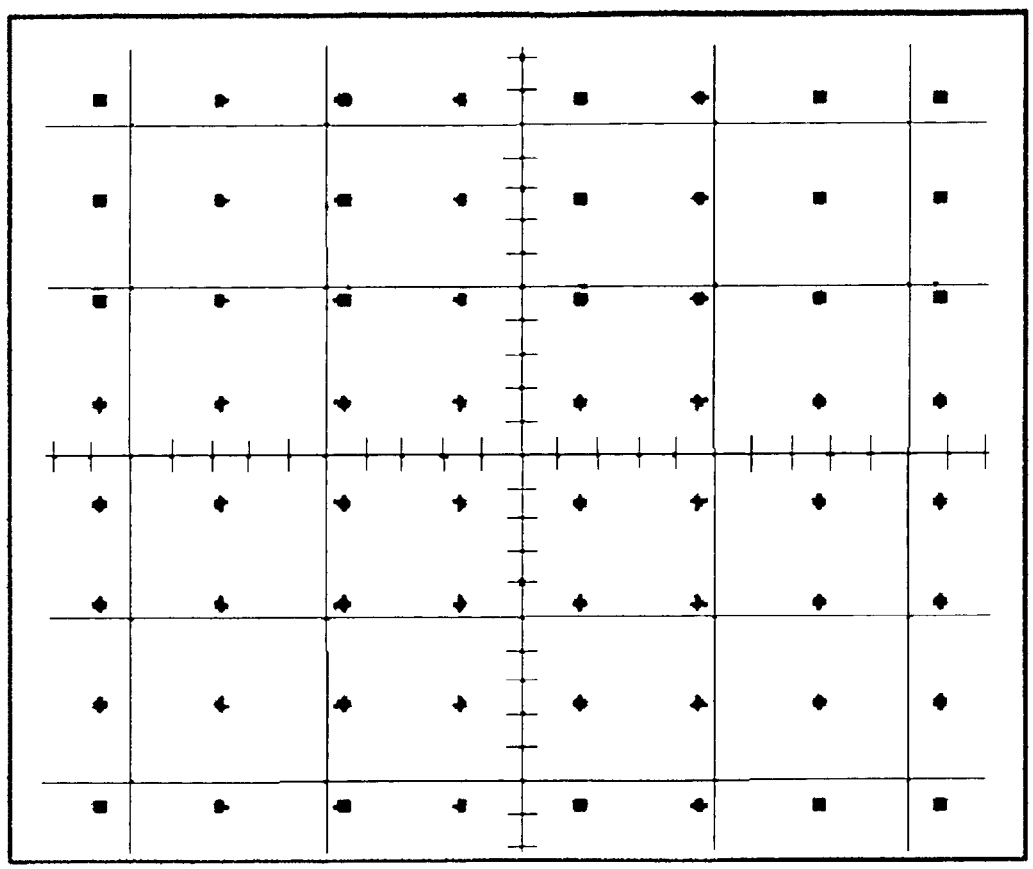
FIG. 2 is a view showing a spatial signal arrangement view of a uniformly arranged 64-QAM signal wave.
Figure 3:
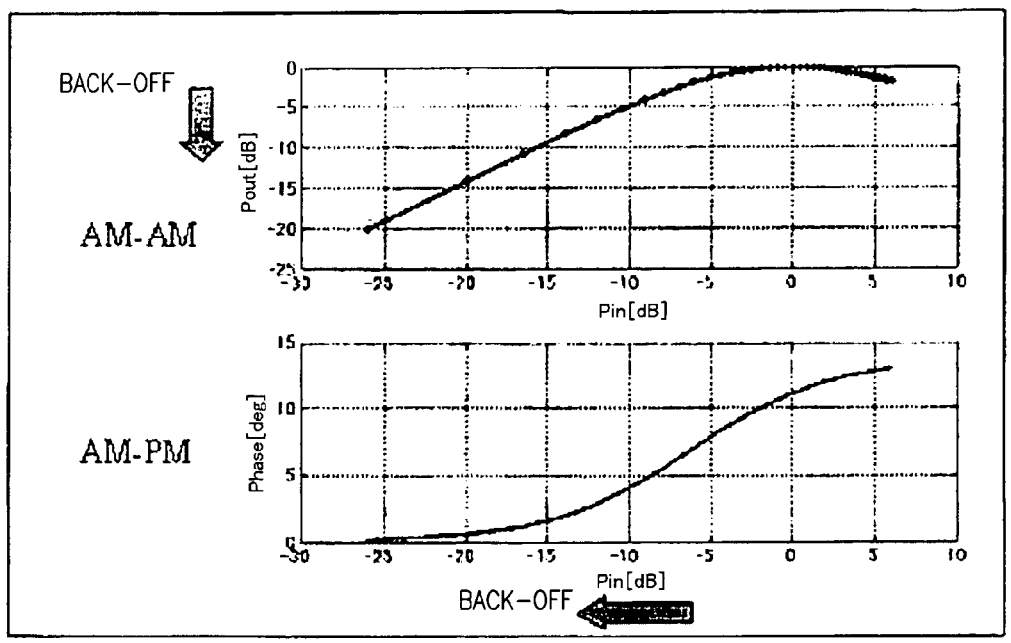
FIG. 3 is a view showing an example of non-linear characteristics of a power.
Figure 4:
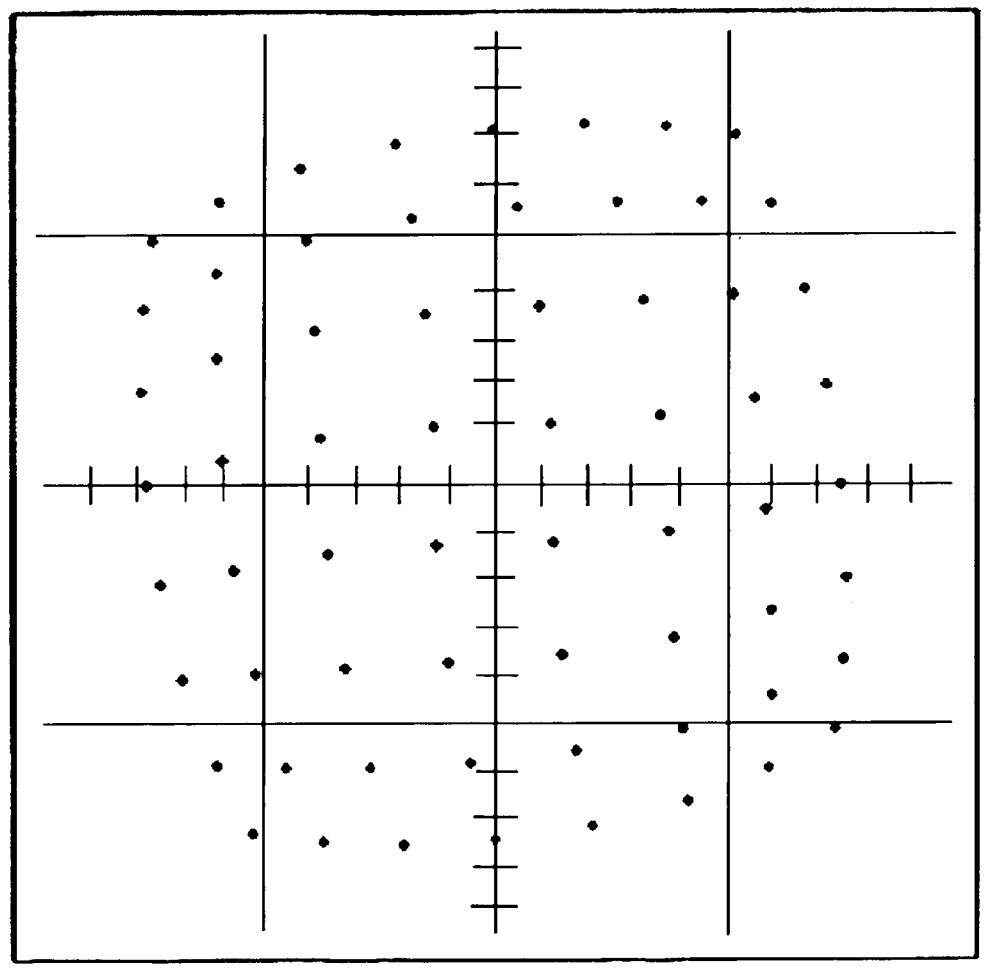
FIG. 4 is a view showing a 64-QAM signal arrangement transformed based on non-linear characteristics of a power amplifier.
Figure 5:
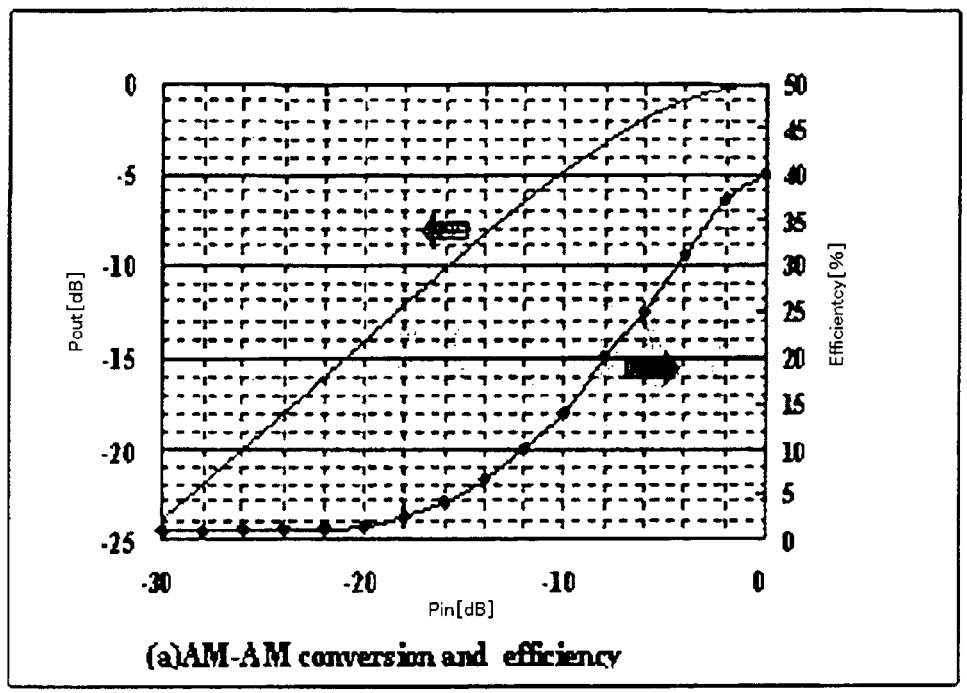
FIG. 5 is a view showing input-output characteristics and power efficiency characteristics of a typical power amplifier.
Figure 6:
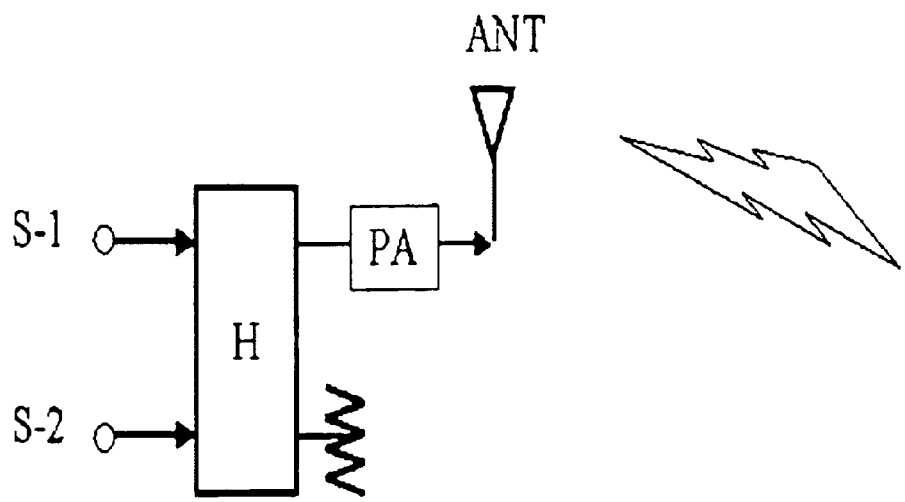
FIG. 6 is a view showing a conventional electric wave combining method of combining two waves by using a hybrid circuit.
Figure 7:
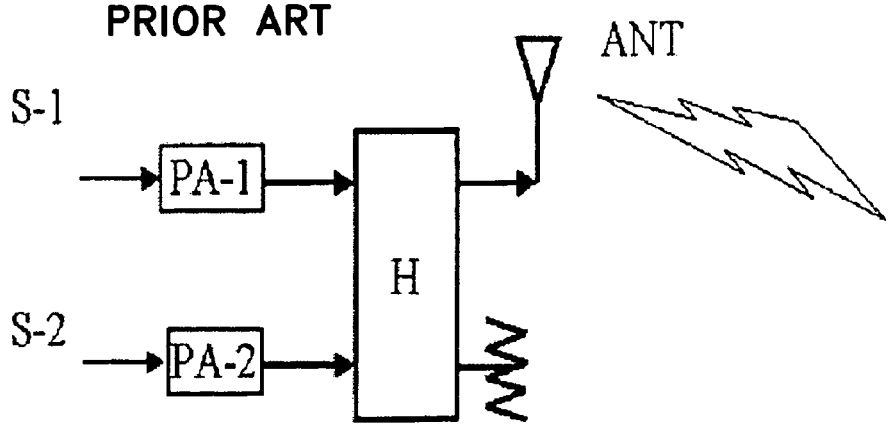
FIG. 7 is a view showing a conventional electric wave combining method of combining two waves by using a hybrid circuit.
Figure 8:
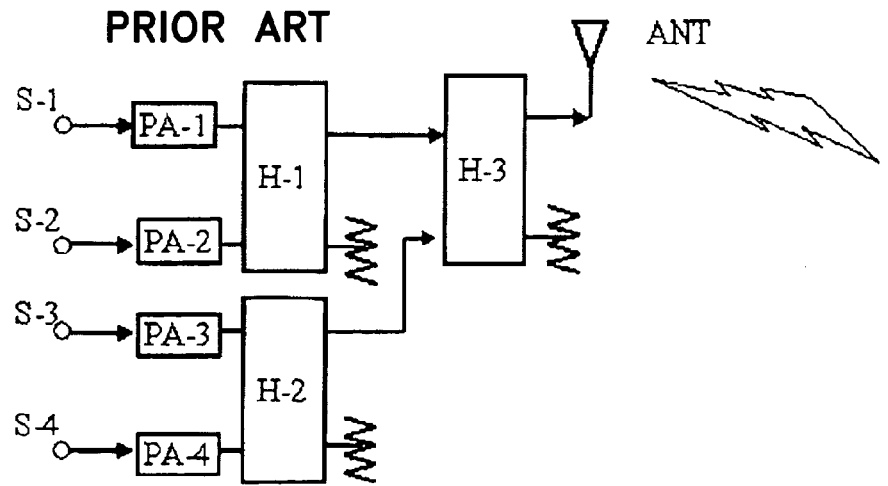
FIG. 8 is a view showing a conventional electric wave combining method of combining four waves by using hybrid circuits.
Figure 9:
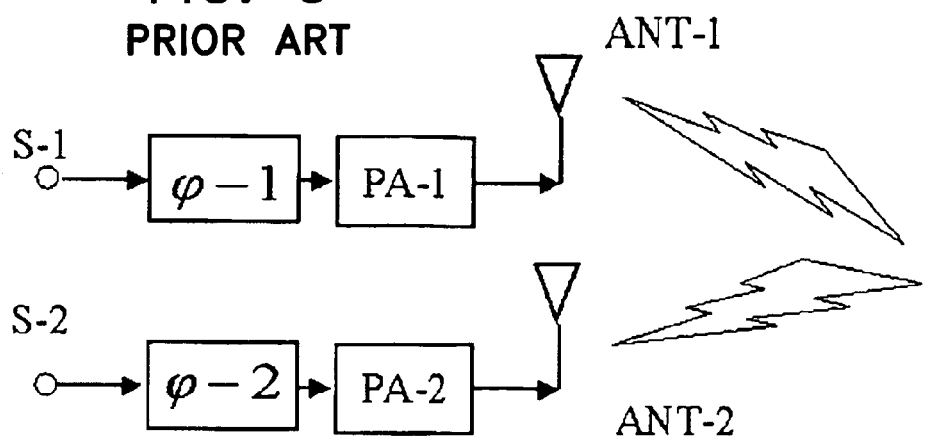
FIG. 9 is a view showing a conventional electric wave combining method of combining two waves by using two antennas.
Figure 10:
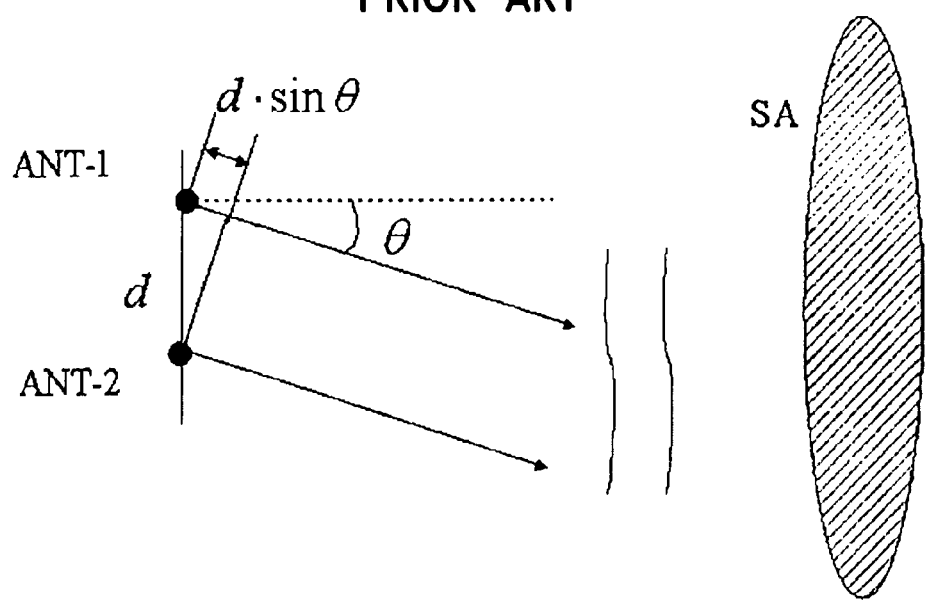
FIG. 10 is a view showing a path difference between both antennas with respect to a faraway reception area.
Figure 11:
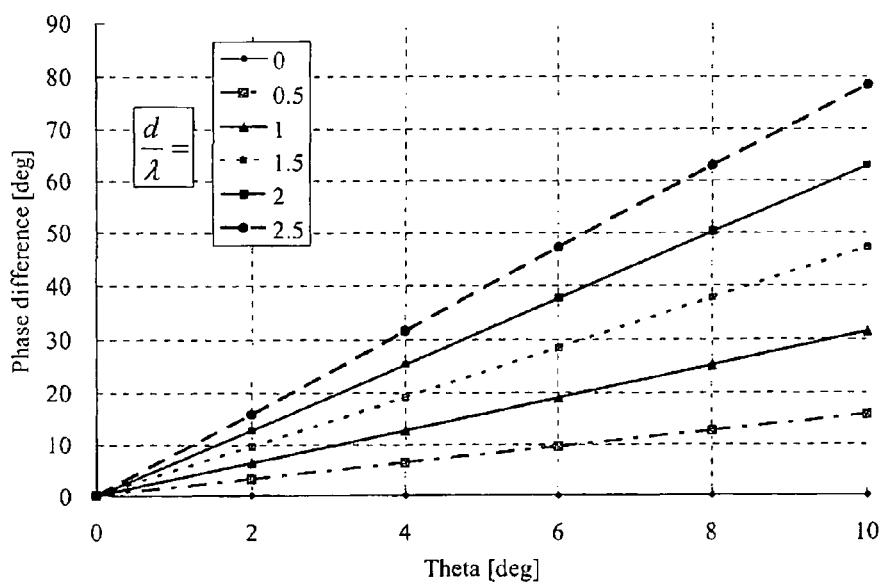
FIG. 11 is a view showing a phase difference between two antenna gains with respect to a distance between the two antennas.
Figure 12:
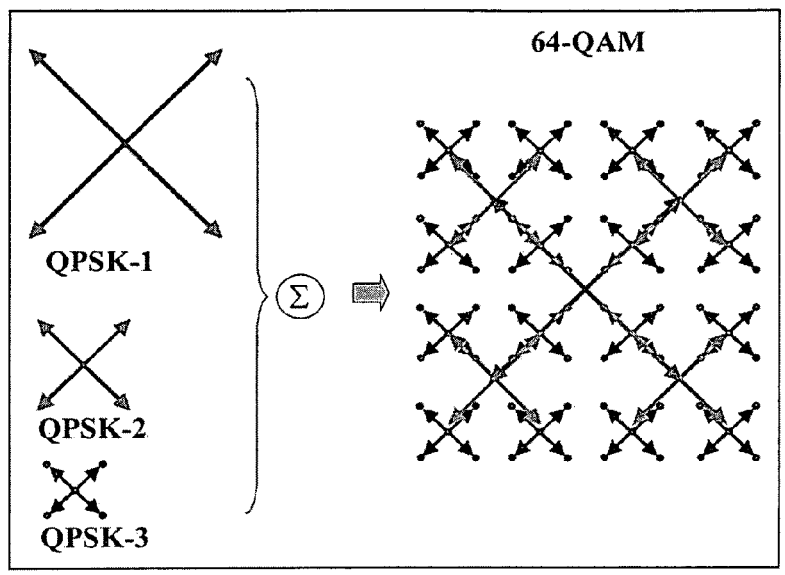
FIG. 12 is a view showing a 64-QAM signal forming method based on combining three QPSK signals.
Figure 13:
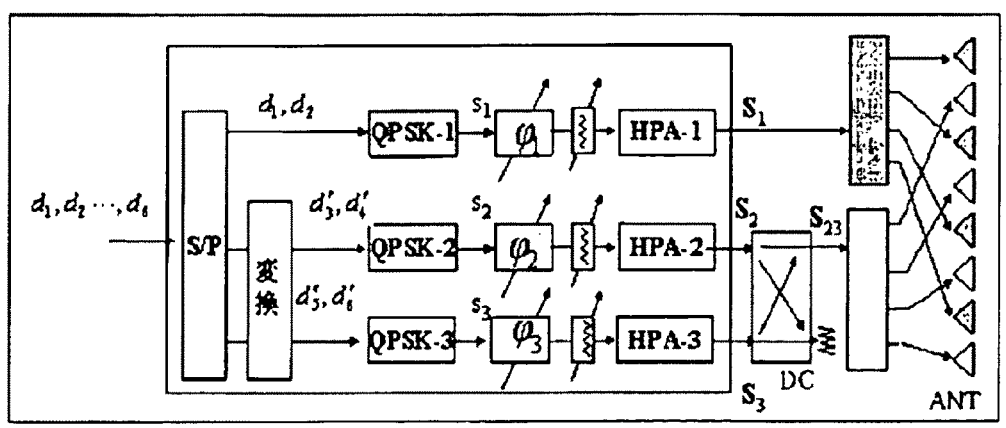
FIG. 13 is a view showing a structure of a spatially superposed 64-QAM transmitting section to which the present invention is applied.
Figure 14:
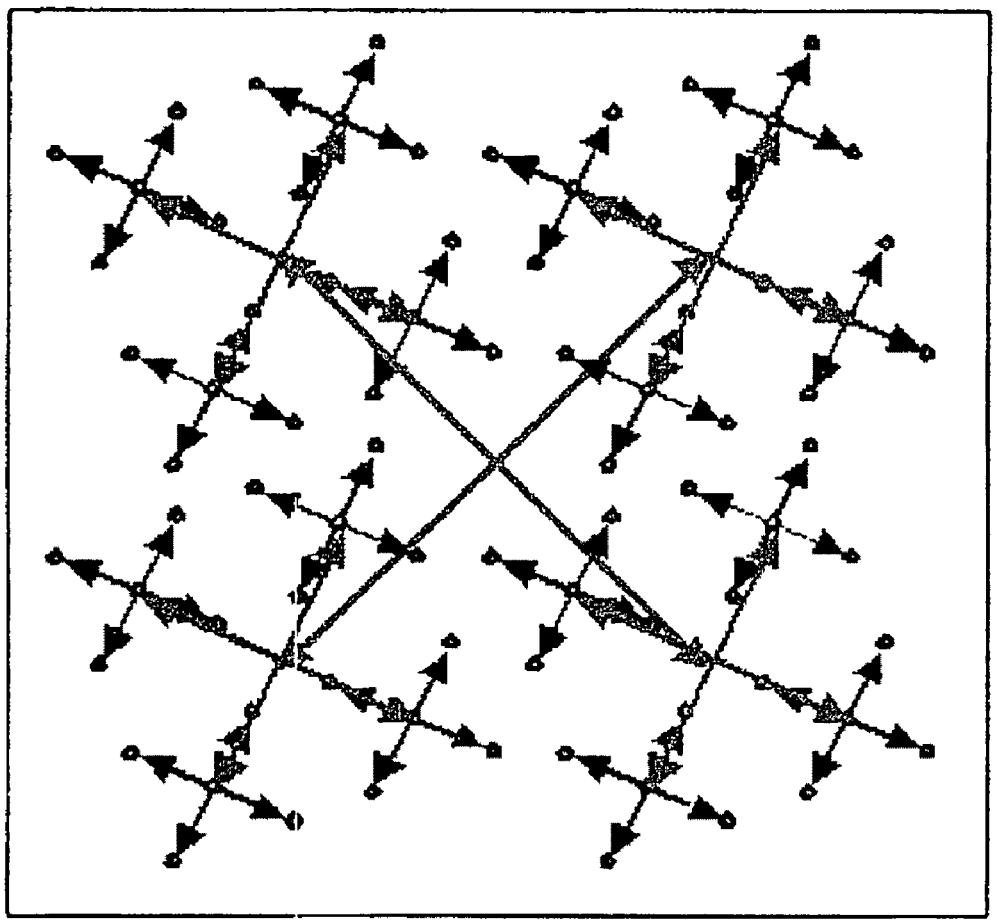
FIG. 14 is a view showing a 64-QAM signal arrangement transformed based on a phase error and a gain error at the time of combination.
Figure 15:
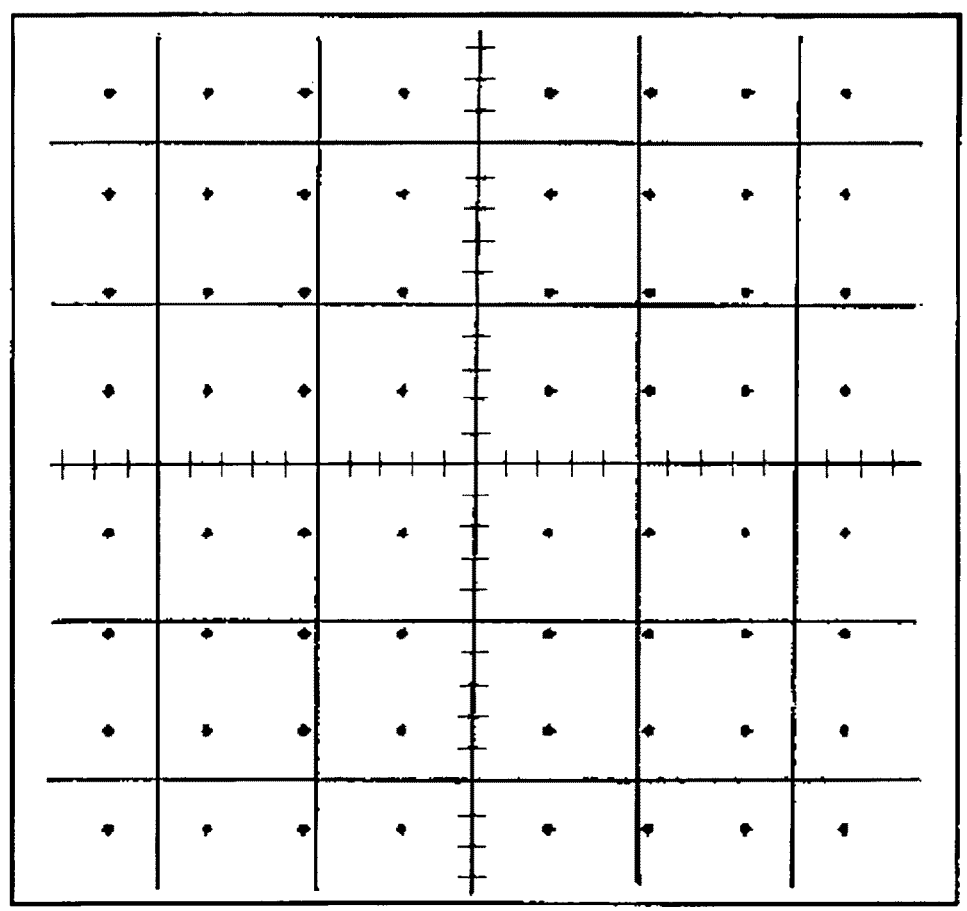
FIG. 15 is a view showing a non-uniform signal arrangement.
Figure 16:
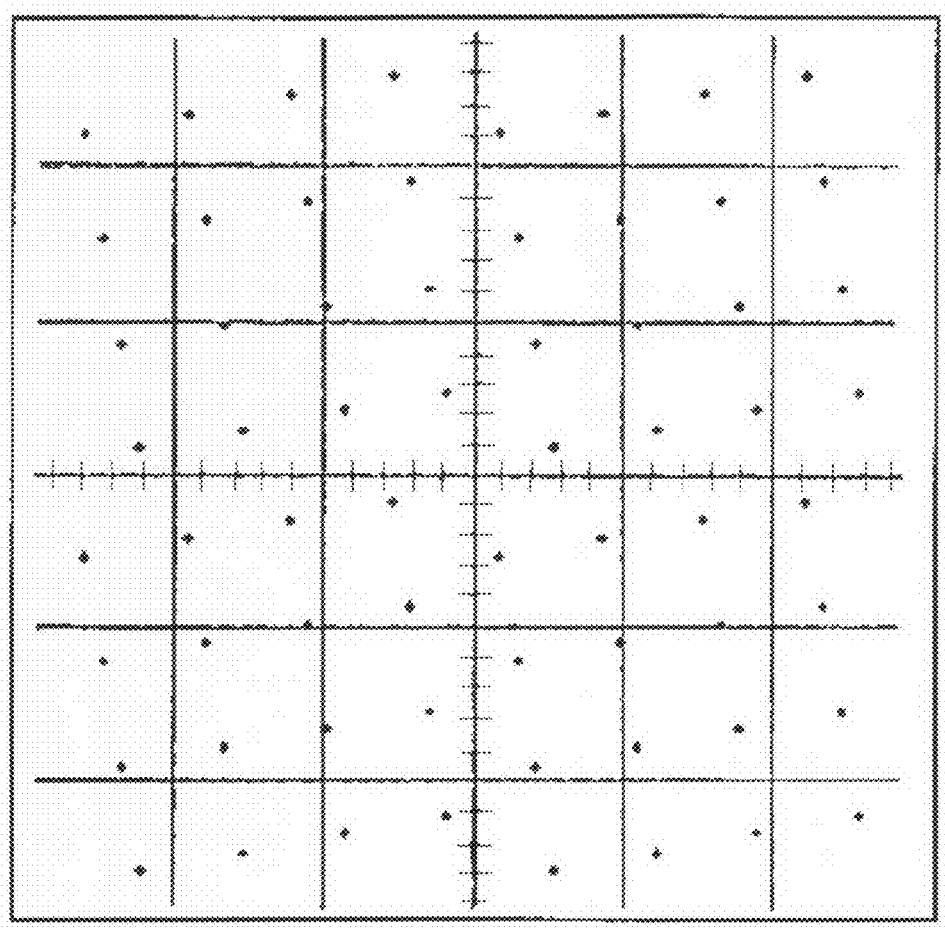
FIG. 16 is a view showing an influence of a gain error and a phase error in the non-uniform signal arrangement.
Figure 17:
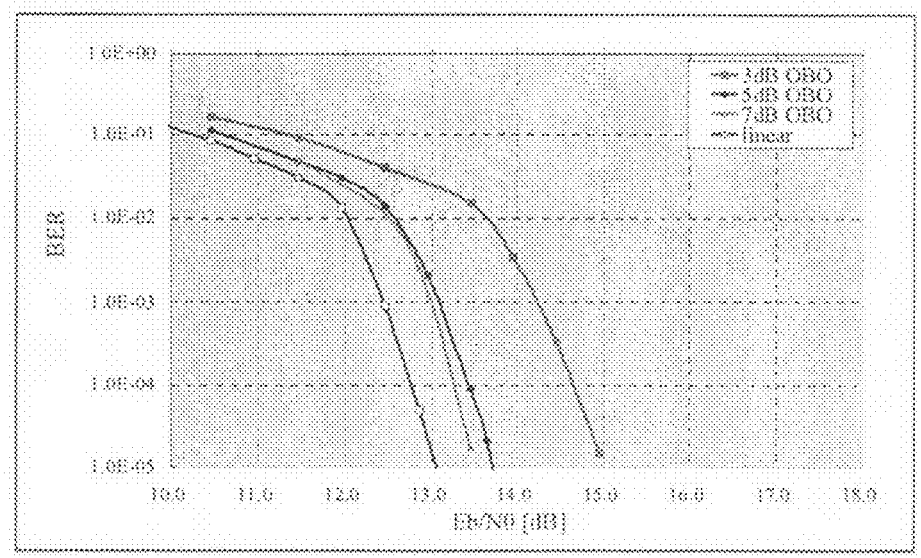
FIG. 17 is a view showing an improvement in transmission characteristics based on output back-off.
Figure 18:
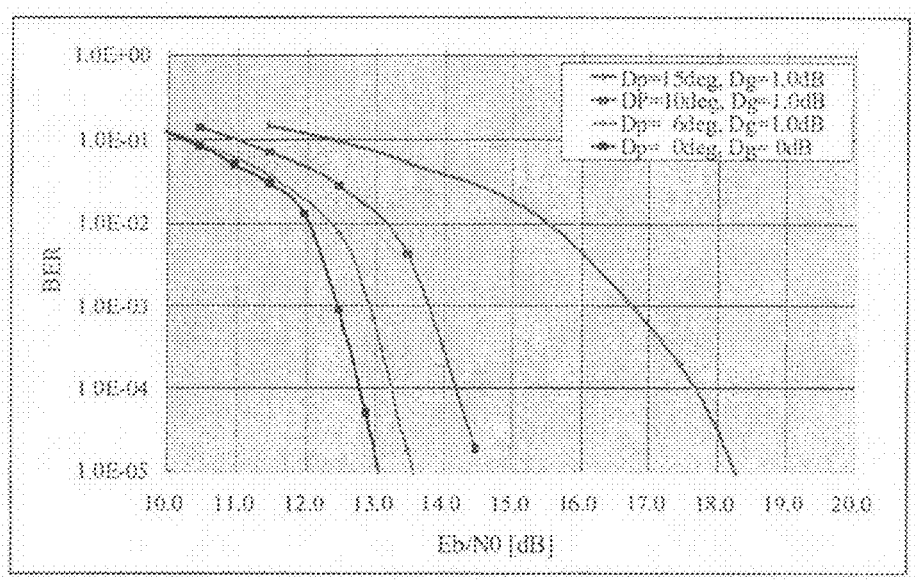
FIG. 18 is a view showing degradation in transmission characteristics due to a phase error and a gain error in spatial superposition.
Figure 19:
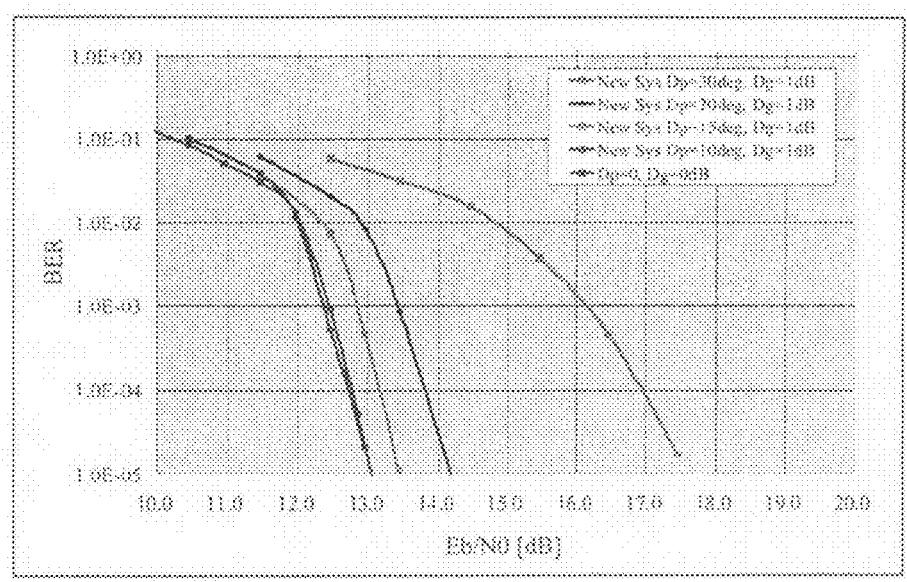
FIG. 19 is a view showing transmission characteristics of 64-QAM to which the present invention is applied.
Figures 20, 21:
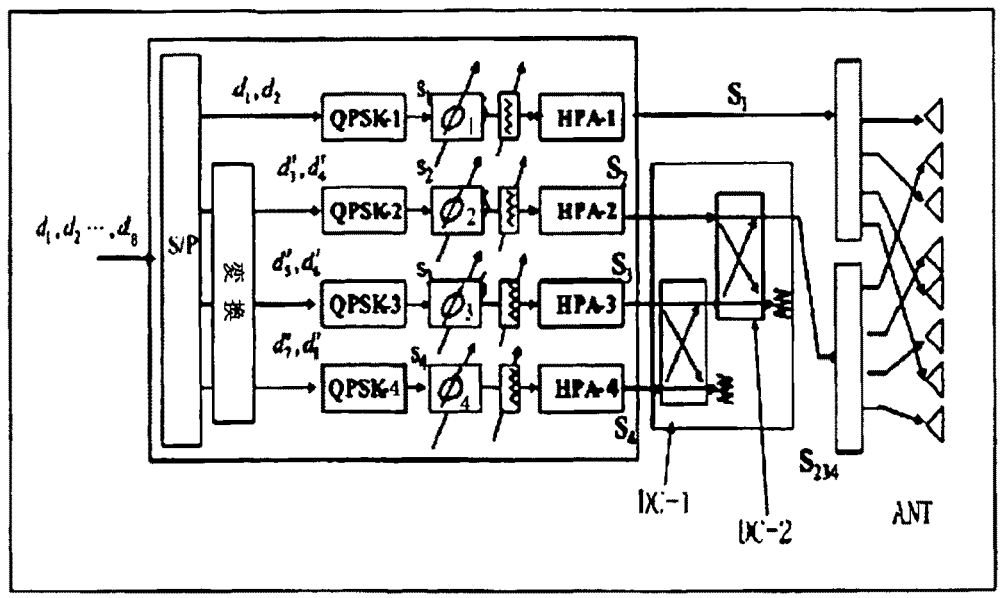
FIG. 20 is a view showing a comparison in power consumption between a conventional method and an example to which the present invention is applied.
FIG. 21 is a view showing a structural example when the present invention is applied to 256-QAM.
Figure 22:
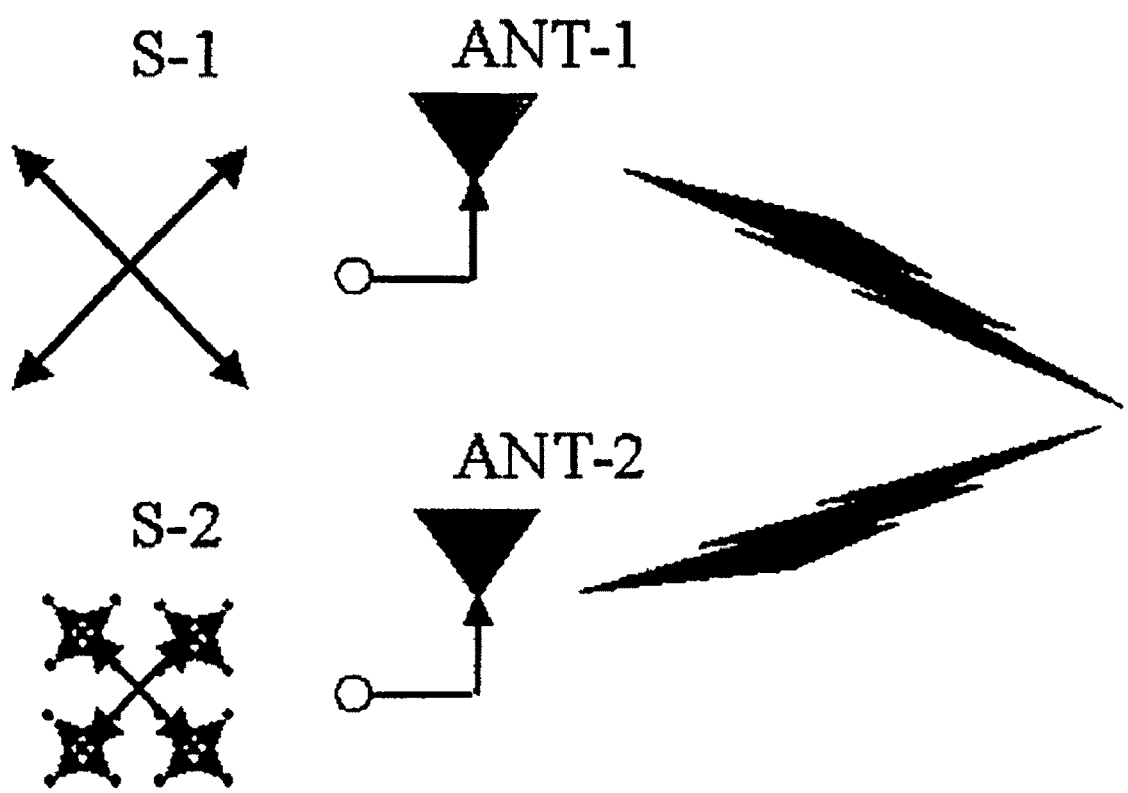
FIG. 22 is a view showing a structure where a QPSK wave is superposed on and combined with a 16-QAM wave to realize 64-QAM.
Figure 23:
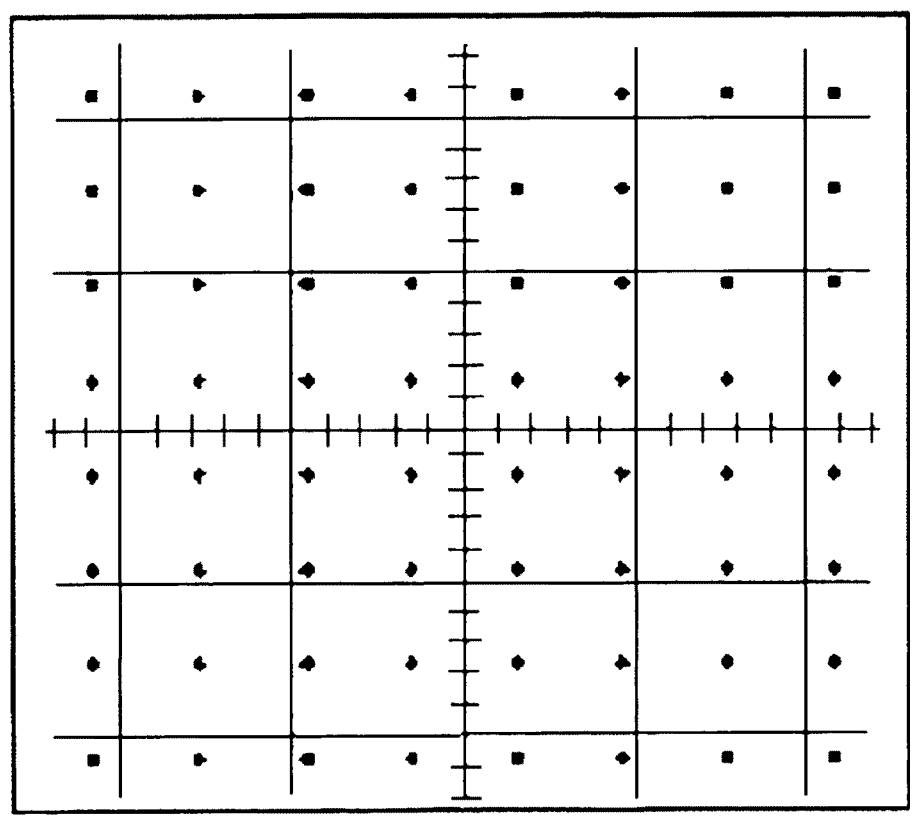
FIG. 23 is a view showing a 64-QAM signal spatial arrangement view when two antenna gains have no phase difference.
Figure 24:
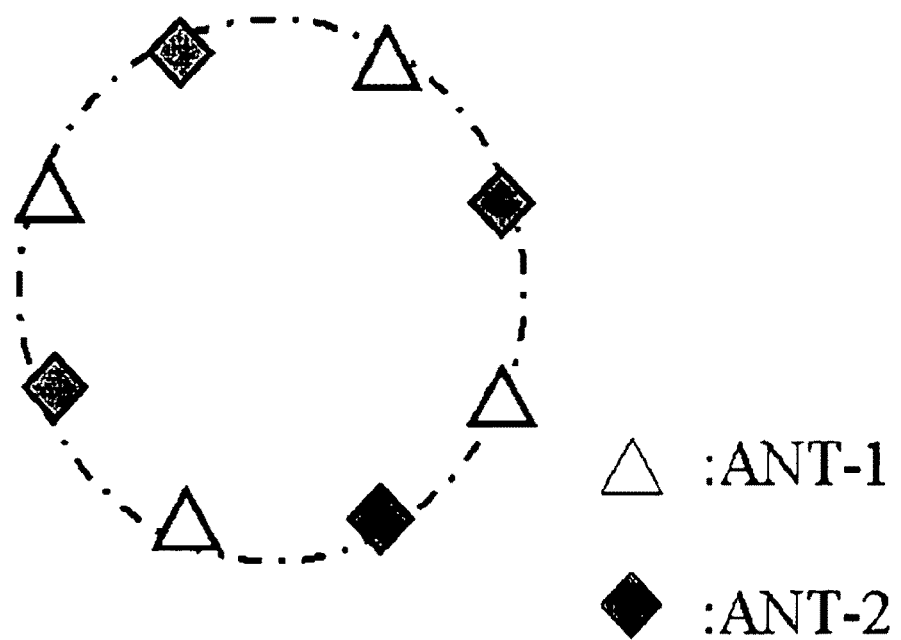
FIG. 24 is a view showing a two-wave superposing/combining antenna in which eight array antenna elements are concentrically arranged.
Figure 25:
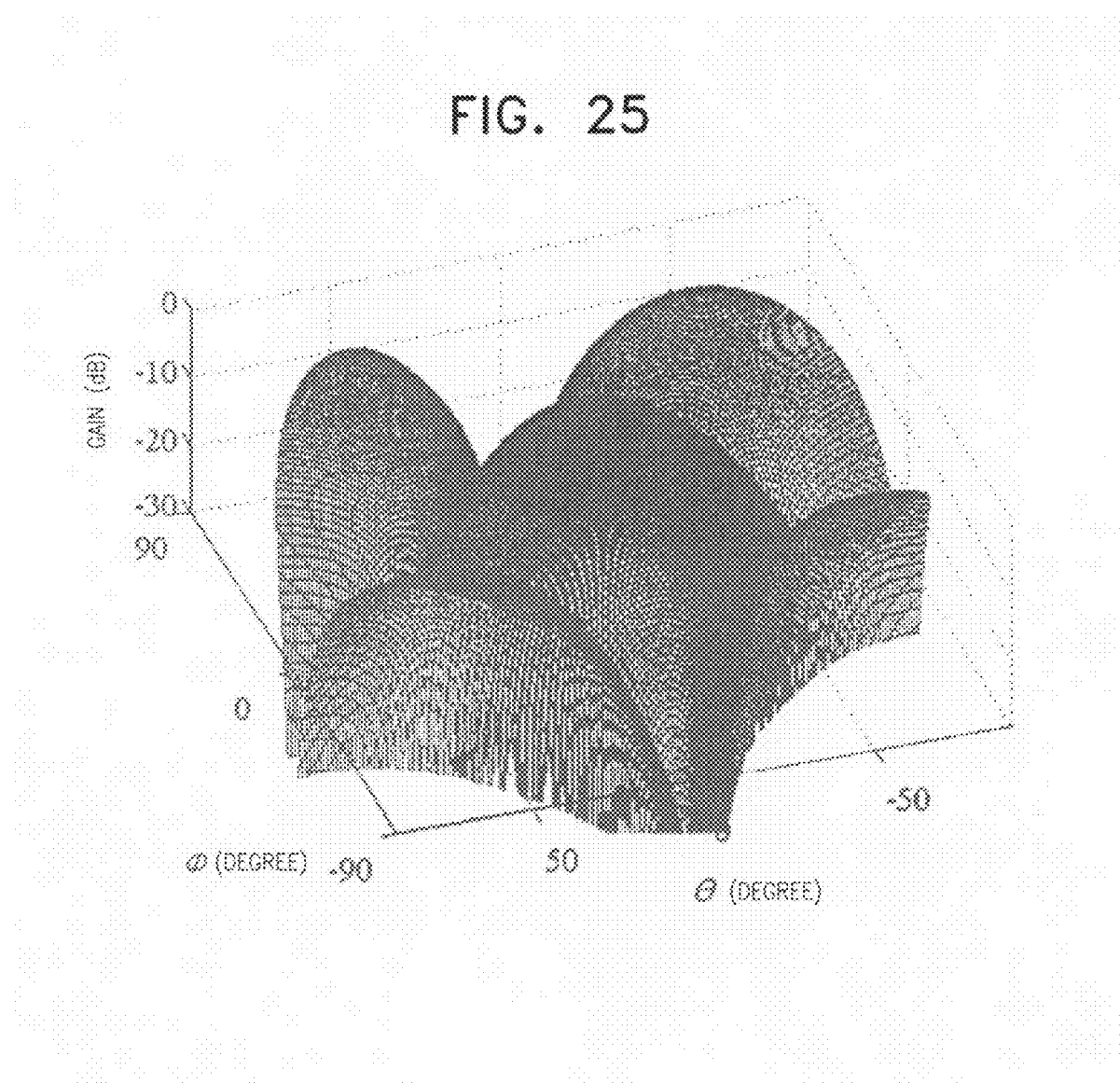
FIG. 25 is a view showing a three-dimensional radiation pattern of one of the two types of antennas depicted in FIG. 24.
Figure 26:
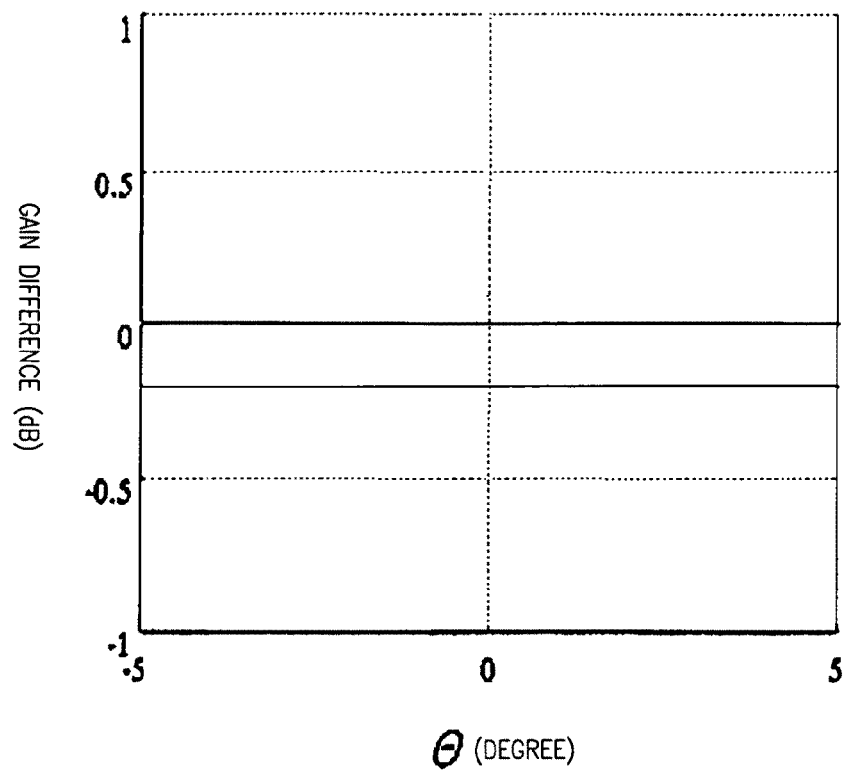
FIG. 26 is a view showing an amplitude difference between gains of the two types of antennas depicted in FIG. 24.
Figure 27:
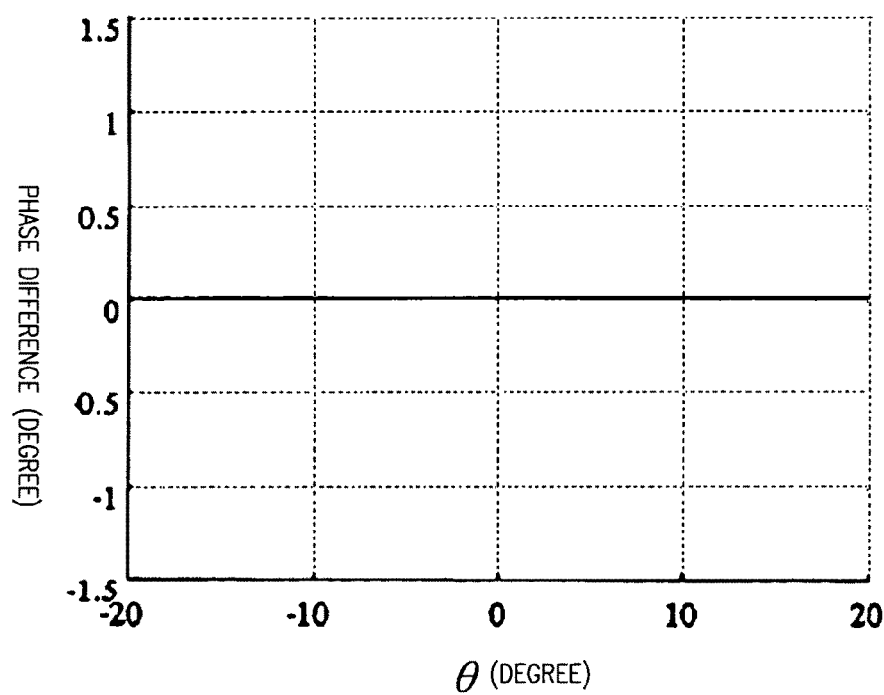
FIG. 27 is a view showing a phase difference between gains of the two types of antennas depicted in FIG. 24.
Figure 28:
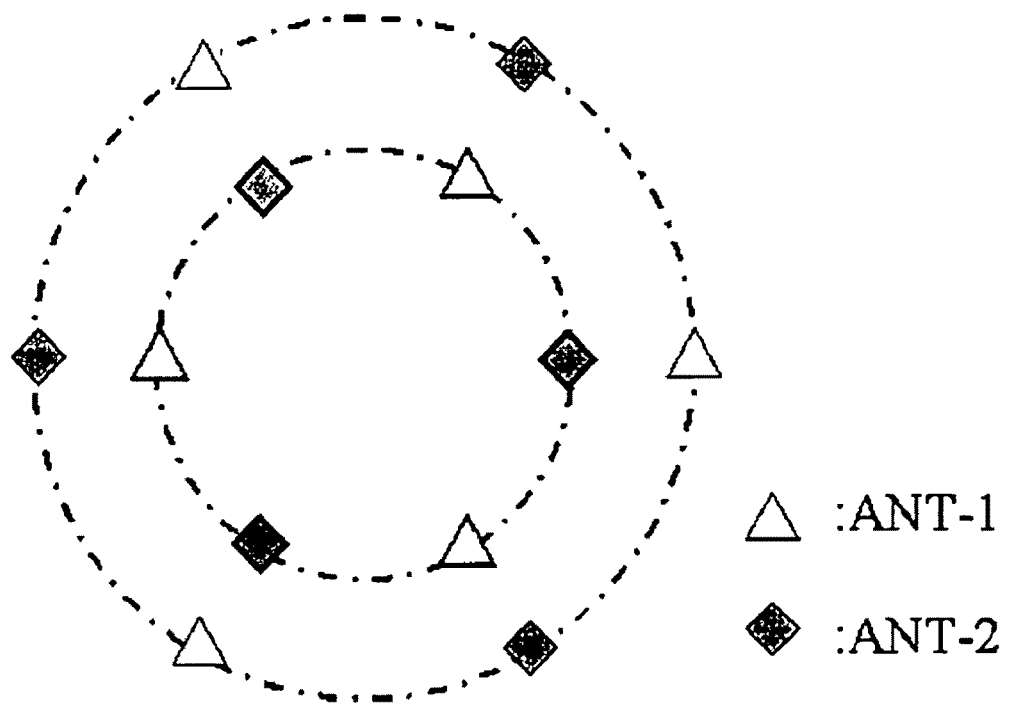
FIG. 28 is a view showing a two-wave superposing/combining antenna in which six array antenna elements are arranged in a double concentric circle pattern.
Figure 29:
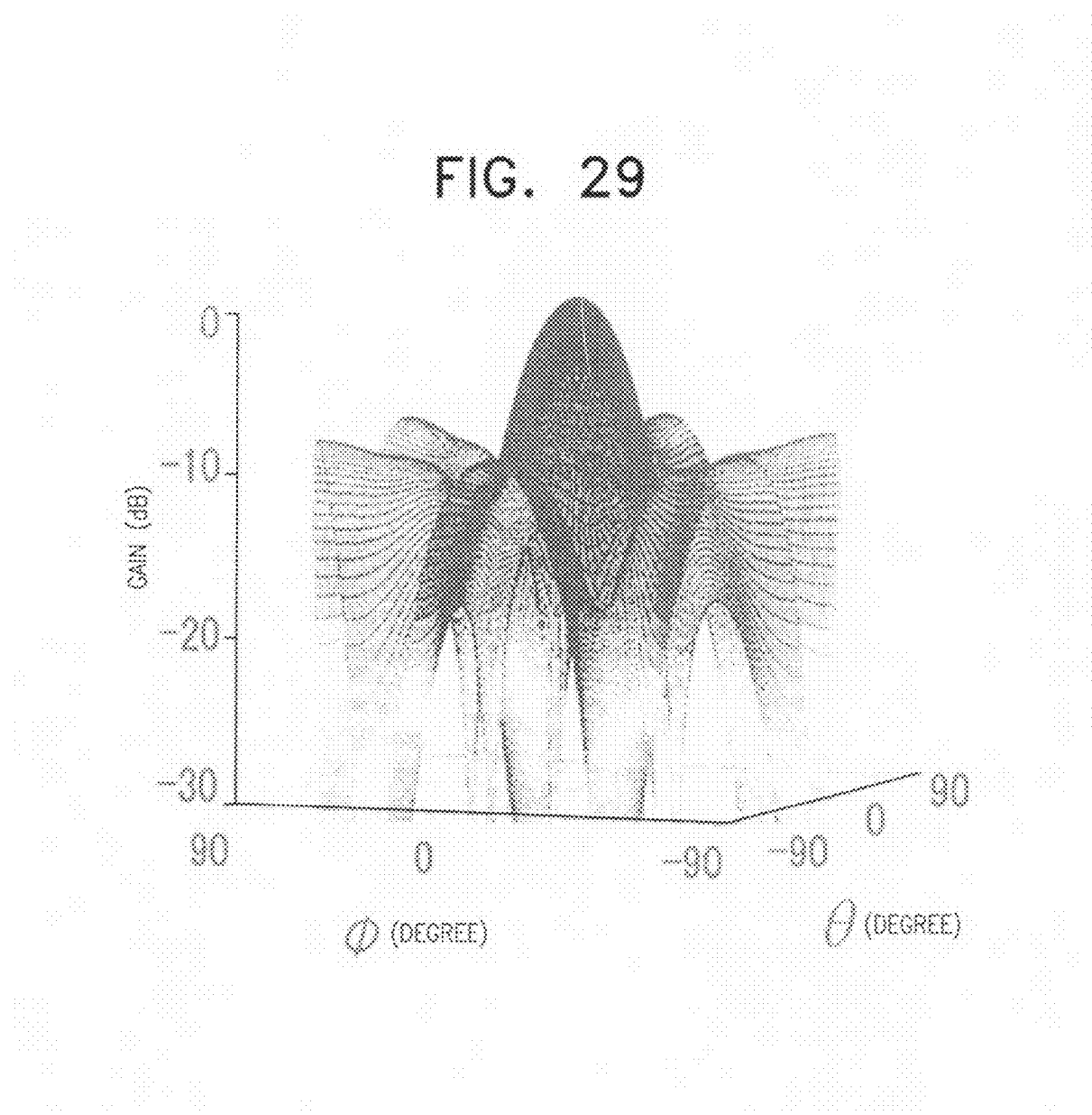
FIG. 29 is a view showing a radiation pattern of one of the two types of antennas depicted in FIG. 28.
Figure 30:
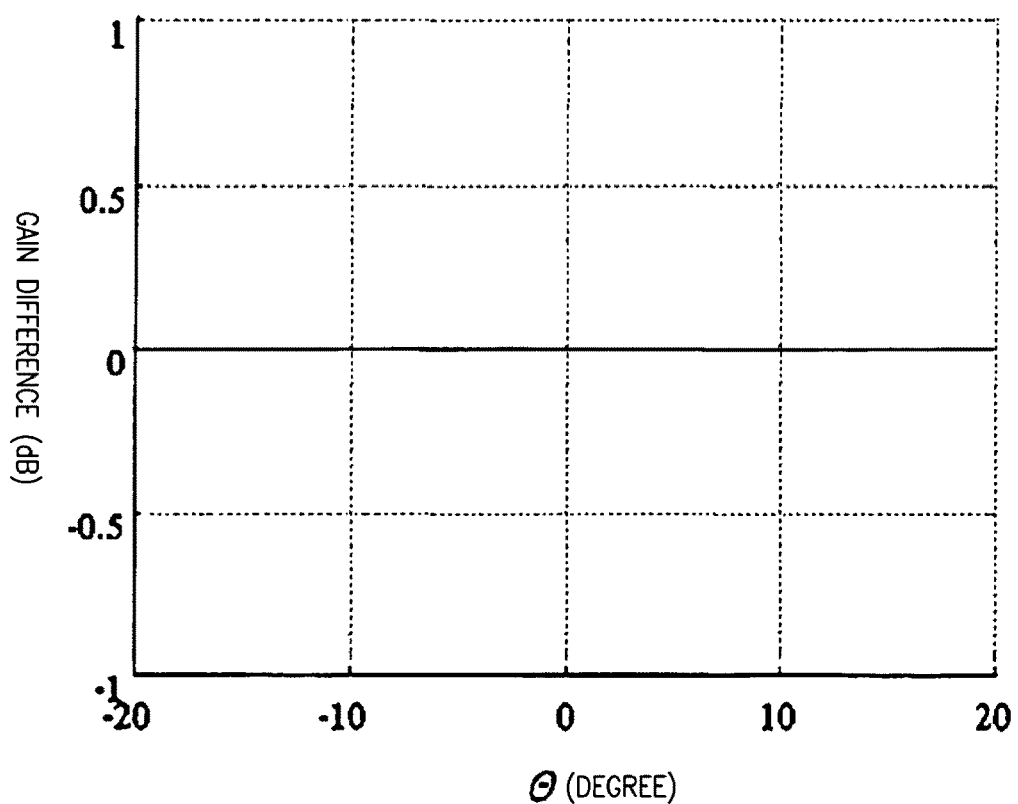
FIG. 30 is a view showing an amplitude difference between gains of the two types of antennas depicted in FIG. 28.
Figure 31:
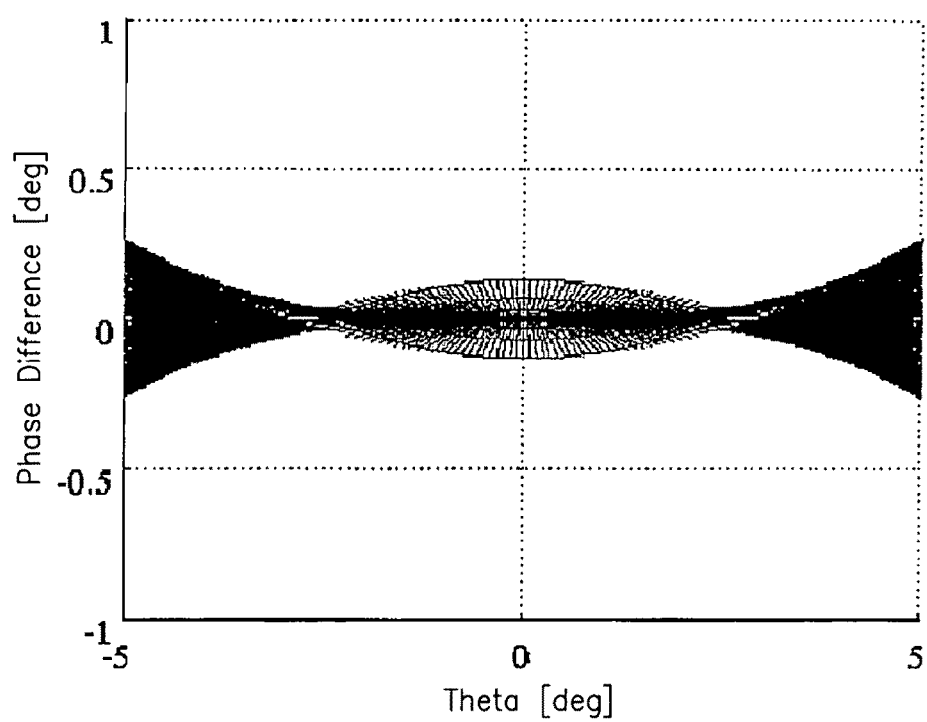
FIG. 31 is a view showing a phase difference between gains of the two types of antennas depicted in FIG. 28.
Figure 32:
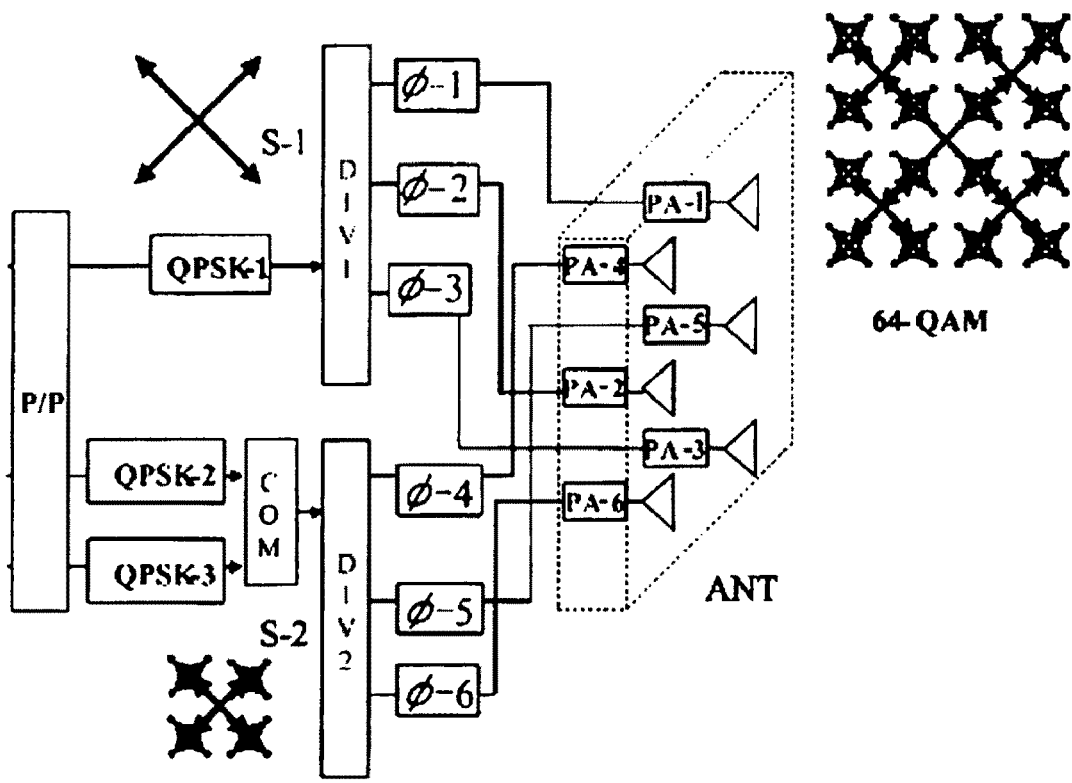
FIG. 32 is a view showing a structure realizing a spatially superposed 64-QAM modulation wave to which the antenna depicted in FIG. 28 is applied.

AM Mod-1, AM Mod-2: modulator
Σ: combiner
HPA: power amplifier
ANT: antenna
QPSK-1, QPSK-2, QPSK-3: QPSK unit
DC, DC-1, DC-2: directional coupler
S-1 to S-4: different signal waves
PA, PA-1 to PA-6: power amplifier
ANT, ANT-1, ANT-2: antenna
H, H-1, H-2, H-3: hybrid circuit
COM: power combiner
DIV: power divider
P/P: parallel/parallel conversion
φ-1 to φ-6: phase shifter
QPSK-1, QPSK-2, QPSK-3: quadri-phase shift keying wave
16-QAM: 16-valued quadrature amplitude modulation wave
64-QAM: 64-valued quadrature amplitude modulation wave
SA: service area

The invention claimed is:

1. A multi-value modulation/demodulation method, comprising the following steps:

generating N quaternary phase shift keying (QPSK) outputs having different amplitude levels $r2=r1\times 2^{-(i-1)}$, i=2 ... N with respect to a maximum amplitude level r1 to form $M(=2^{2N})$-valued/quadrature amplitude modulation (QAM);

power amplifying powers of N-1 outputs si from respective executions of quaternary phase shift keying QPSK-i (i=2 to n) except the quaternary phase shift keying QPSK-1 having the maximum amplitude r1 at the time of the formation;

performing a combination by using a directional coupler having N-1 input terminals and one output terminal to obtain a combined signal after power amplification;

transmitting an output of the quaternary phase shift keying QPSK-1 and the combined signal from two systems of antennas; and vectorially superposing and combining the transmitted signals in a space.

2. The multi-level modulation/demodulation method according to claim 1, wherein a series/parallel converter is provided before each QPSK unit to divide input data of 2N bits and input the divided data to each QPSK unit, a data converting function is used to perform gray encoding by which a code distance between codes adjacent to each other becomes 1, and a variable gain unit and a variable phase shifter adjust a gain and a phase in a signal path of each QPSK unit and a power amplifier.

3. The multi-level modulation/demodulation method according to claim 2, wherein a signal spatial arrangement that is a non-uniform arrangement where the amplitude of the quadri-phase shift keying QPSK-1 having the highest amplitude is increased as compared with the uniform arrangement where geometrical distances between respective signal points are equal is used as a signal spatial arrangement to perform modulation.

4. The multi-level modulation/demodulation method according to claim 3, wherein a gain (amplitude) error and a phase error as errors at the time of vector-combining an output signal of the QPSK-1 with a combined signal of the plurality of executions of QPSK-i (i=2 to N) are estimated from a reception signal when transmitting a known signal, these estimated values are used to consider the gain error and the phase error, and a demodulation symbol is detected from a transformed signal spatial arrangement and the reception signal.

5. A multi-level modulation/demodulation apparatus comprising:

quaternary phase shift keying units that superpose N (integer equal to or above 3) quaternary phase shift keying (QPSK) outputs having different amplitude levels, $r2=r1\times 2^{-(i-1)}$, i=2 ... N with respect to a maximum amplitude level r1 after power amplification to form $M(=2^{2N})$-valued/quadrature amplitude modulation (QAM);

a power amplifier that amplifies powers of N-1 outputs si from respective executions of quaternary phase shift keying QPSK-i (i=2 to N) except the quaternary phase shift keying QPSK-1 at the time of formation;

means for performing combination by using a directional coupler having N-1 input terminals and one output terminal to obtain a combined signal after power amplification;

two systems of antennas that transmit an output of the quaternary phase shift keying QPSK-1 and the combined signal; and means for vectorially superposing and combining these transmitted signals in a space, wherein a variable gain unit and a variable phase shifter which are arranged in a signal path of each quaternary phase shift keying unit and the power amplifier to adjust a gain and a phase, a series/parallel converter which divides input data of 2N bits and inputs the divided data to each quaternary phase shift keying unit, and data converting means for performing gray encoding by which a code distance between codes adjacent to each other becomes 1 are provided before each quaternary phase shift keying unit.

6. The multi-level modulation/demodulation apparatus according to claim 5, wherein a signal spatial arrangement that is a non-uniform arrangement in which the amplitude of the quadri-phase shift keying QPSK-1 having the highest amplitude is increased as compared with the uniform arrangement where geometrical distances between respective signal points are equal is used as a signal spatial arrangement to perform modulation.

7. The multi-level modulation/demodulation apparatus according to claim 6, wherein a gain (amplitude) error and a phase error as errors at the time of vector-combining an output signal of the quadri-phase shift keying QPSK-1 with a combined signal of the plurality of executions of quadriphase shift keying QPSK-i (i=2 to N) are estimated from a reception signal when transmitting a known signal, these estimated values are used to consider the gain error and the phase error, and a demodulation symbol is detected from a transformed signal spatial arrangement and the reception signal.

8. A multi-level modulation/demodulation method comprising the following step:

dividing an output having a highest amplitude level of outputs of a plurality of executions of quaternary phase shift keying (QPSK) by a first power division circuit, wherein, the plurality of executions are N-QPSK (quaternary phase shift keying) outputs (N is an integer equal to 3 or above) having different amplitude levels $r2=r1 \times 2^{-(i-1)}$, $i=2 \ldots N$ with respect to a maximum amplitude level r1 to form $M(=2^{2N})$-valued/quadrature amplitude modulation (QAM);

amplifying the power divided outputs by a power amplifier to be fed to an antenna circuit;

combining the outputs other than the highest amplitude level;

dividing the combined outputs by a second power division circuit; and amplifying the power divided outputs, generated by the second power division circuit, by a power amplifier to be fed to an antenna element.

* * * * *